US012761602B2

(12) United States Patent
Boettcher et al.

(10) Patent No.: US 12,761,602 B2
(45) Date of Patent: Oct. 13, 2026

(54) AIR DUCT FOR AN ELECTROPHOTOGRAPHIC IMAGE FORMING DEVICE

(71) Applicant: LEXMARK INTERNATIONAL, INC., Lexington, KY (US)

(72) Inventors: Brian Lester Boettcher, Versailles, KY (US); Richard Louis Goin, Lexington, KY (US); Tyler William Harvey, Nicholasville, KY (US); Matthew David Heid, Louisville, KY (US); William Victor Stieben, Versailles, KY (US); Aaron Jeremy McNely, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 19/036,189

(22) Filed: Jan. 24, 2025

(65) Prior Publication Data

US 2025/0237995 A1 Jul. 24, 2025

Related U.S. Application Data

(60) Provisional application No. 63/624,494, filed on Jan. 24, 2024.

(51) Int. Cl.
*G03G 21/20* (2006.01)
*G03G 15/08* (2006.01)

(52) U.S. Cl.
CPC ....... *G03G 21/206* (2013.01); *G03G 15/0875* (2013.01); *G03G 15/0886* (2013.01)

(58) Field of Classification Search
CPC ............. G03G 21/206; G03G 15/0875; G03G 15/0886
See application file for complete search history.

(56) References Cited

U.S. PATENT DOCUMENTS

| | | | |
|---|---|---|---|
| 8,078,079 B2 | 12/2011 | Brown et al. | |
| 2011/0206408 A1 | 8/2011 | Brown et al. | |
| 2017/0017200 A1* | 1/2017 | Oya ..................... | G03G 21/206 |
| 2018/0011441 A1 | 1/2018 | Ueno | |
| 2019/0384216 A1* | 12/2019 | Yoshioka ............. | G03G 21/206 |

* cited by examiner

*Primary Examiner* — Sandra Brase
(74) *Attorney, Agent, or Firm* — Justin M. Tromp

(57) ABSTRACT

An imaging system according to one example embodiment includes a rotatable photoconductive drum having an outer surface. A rotatable developer roll has an outer surface in contact with the outer surface of the photoconductive drum for supplying toner to the outer surface of the photoconductive drum. A rotatable charge roll has an outer surface in contact with the outer surface of the photoconductive drum for electrically charging the outer surface of the photoconductive drum. An air duct has at least one outlet positioned to direct forced air flowing through the air duct to at least one of the outer surface of the charge roll and the outer surface of the photoconductive drum for indirectly cooling the developer roll without directing forced air from the air duct directly onto the outer surface of the developer roll.

8 Claims, 10 Drawing Sheets

AIR DUCT FOR AN ELECTROPHOTOGRAPHIC IMAGE FORMING DEVICE

CROSS REFERENCES TO RELATED APPLICATIONS

This application claims priority to U.S. Provisional Patent Application Ser. No. 63/624,494, filed Jan. 24, 2024, entitled "Air Duct for an Electrophotographic Image Forming Device," the content of which is hereby incorporated by reference in its entirety.

BACKGROUND

1. Field of the Disclosure

The present disclosure relates generally to image forming devices and more particularly to an air duct for an electrophotographic image forming device.

2. Description of the Related Art

During the electrophotographic printing process, an electrically charged rotating photoconductive drum is selectively exposed to a laser beam. The areas of the photoconductive drum exposed to the laser beam are discharged, creating an electrostatic latent image of a page to be printed on the photoconductive drum. Toner particles from a developer roll are then electrostatically picked up by the latent image on the photoconductive drum, creating a toned image on the drum. The toned image is transferred to the print media (e.g., paper), either directly by the photoconductive drum or indirectly by an intermediate transfer member. The toner is then fused to the media using heat and pressure to complete the print.

Various seals prevent toner from leaking between components of an electrophotographic printer. For example, toner leakage may occur from gaps between the developer roll, a doctor blade in contact with the developer roll and a housing that holds the developer roll and the doctor blade. Seals may be provided to effectively close the gaps between these components to prevent toner leakage. For example, a J-shaped seal may be used at each axial end of the developer roll to prevent toner from leaking out of the junction between the developer roll, the doctor blade and the housing.

When the developer roll rotates during print operation, the interface between the developer roll and the J-shaped seal creates heat due to friction between the developer roll and the seal. In some cases, the heat generated between the developer roll and the seal may limit the operating speed and duty cycle of the printer.

SUMMARY

An imaging system according to one example embodiment includes a rotatable photoconductive drum having an outer surface. A rotatable developer roll has an outer surface in contact with the outer surface of the photoconductive drum for supplying toner to the outer surface of the photoconductive drum. A rotatable charge roll has an outer surface in contact with the outer surface of the photoconductive drum for electrically charging the outer surface of the photoconductive drum. An air duct has at least one outlet positioned to direct forced air flowing through the air duct to at least one of the outer surface of the charge roll and the outer surface of the photoconductive drum for indirectly cooling the developer roll without directing forced air from the air duct directly onto the outer surface of the developer roll.

An imaging system according to another example embodiment includes a rotatable photoconductive drum having an outer surface. A rotatable developer roll has an outer surface in contact with the outer surface of the photoconductive drum for supplying toner to the outer surface of the photoconductive drum. A rotatable charge roll has an outer surface in contact with the outer surface of the photoconductive drum for electrically charging the outer surface of the photoconductive drum. An end seal has a curved rotary seal portion in contact with the outer surface of the developer roll near an axial end of the developer roll. An air duct has at least one outlet positioned to direct forced air flowing through the air duct to at least one of the charge roll and the photoconductive drum facilitating a transfer of heat generated by friction between the developer roll and the end seal from the developer roll to the photoconductive drum.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense, and the scope of the present disclosure is defined only by the appended claims and their equivalents.

Figure 1:
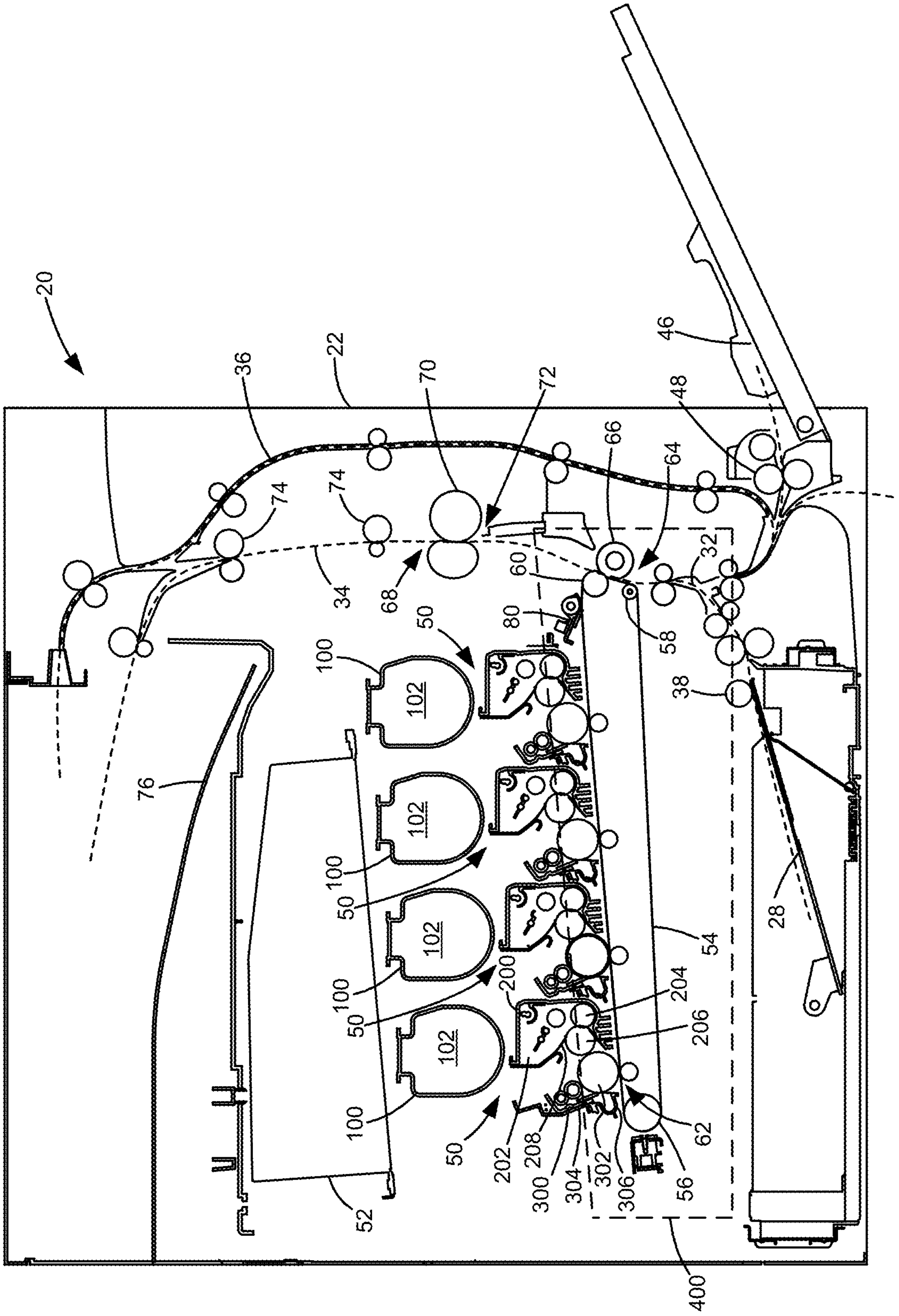
FIG. 1 is a schematic view of an image forming device according to one example embodiment.

FIG. 1 illustrates a schematic view of the interior of an example image forming device 20. Image forming device 20 includes a housing 22. Housing 22 includes one or more input trays 28 positioned therein. Each tray 28 is sized to contain a stack of media sheets. As used herein, the term media is meant to encompass not only paper but also labels, envelopes, fabrics, photographic paper and any other desired substrate. Trays 28 are preferably removable for refilling. A control panel may be located on housing 22. Using the control panel, a user can enter commands and generally control the operation of image forming device 20. For example, a user may enter commands to switch modes (e.g., color mode, monochrome mode), view the number of images printed, etc. A media path 32 extends through image forming device 20 for moving the media sheets through the image transfer process. Media path 32 includes a simplex path 34 and may include a duplex path 36. A media sheet is introduced into simplex path 34 from tray 28 by a pick mechanism 38. In the example embodiment shown, pick mechanism 38 includes a roll positioned to move the media sheet from tray 28 and into media path 32. The media sheet is then moved along media path 32 by various transport rollers. Media sheets may also be introduced into media path 32 by a manual feed 46 having one or more rolls 48 or by additional media trays.

Image forming device 20 includes an image transfer section that includes one or more imaging stations 50. A monocolor image forming device 20 may include a single imaging station 50 as compared to a color image forming device 20 that may include multiple imaging stations 50. Each imaging station 50 includes a toner cartridge 100, a developer unit 200 and a photoconductor unit (PC unit) 300. Each toner cartridge 100 includes a reservoir 102 for holding toner and an outlet port in communication with an inlet port of a corresponding developer unit 200 for transferring toner from reservoir 102 to developer unit 200. In the example embodiment illustrated, developer unit 200 utilizes what is commonly referred to as a single component development system. In this embodiment, each developer unit 200 includes a toner reservoir 202 and a toner adder roll 204 that moves toner from reservoir 202 to a developer roll 206. Each PC unit 300 includes a photoconductive (PC) drum 302, a charging roll 304, and a cleaner unit 306 for each imaging station 50. PC drums 302 are mounted substantially parallel to each other. For purposes of clarity, developer unit 200 and PC unit 300 are labeled on only one of the imaging stations 50 in FIG. 1. In the example embodiment illustrated, each imaging station 50 is substantially the same except for the color or type of toner contained therein.

Each charging roll 304 forms a nip with the corresponding PC drum 302. During a print operation, charging roll 304 charges the outer surface of PC drum 302 to a specified voltage. A laser beam from a printhead 52 associated with each imaging station 50 is then directed to the outer surface of PC drum 302 and selectively discharges those areas it contacts to form a latent image. Developer roll 206 then transfers toner to PC drum 302 to form a toner image on the surface of PC drum 302. A metering device, such as a doctor blade 208, may be used to meter toner on the outer surface of developer roll 206 and apply a desired charge to the toner prior to its transfer to PC drum 302. Toner on developer roll 206, which forms a nip with PC drum 302, is attracted to the areas of the outer surface of PC drum 302 discharged by the laser beam from printhead 52.

In the example embodiment illustrated, an intermediate transfer mechanism (ITM) 54 is disposed adjacent to imaging stations 50. In this embodiment, ITM 54 is formed as an endless belt trained about a drive roll 56, a tension roll 58 and a back-up roll 60. During print operations, ITM 54 moves past imaging stations 50 in a counterclockwise direction as viewed in FIG. 1. One or more of PC drums 302 apply toner images in their respective colors to ITM 54 at a first transfer nip 62. ITM 54 rotates and collects the one or more toner images from imaging stations 50 and then conveys the toner images to a media sheet advancing through simplex path 34 at a second transfer nip 64 formed between a transfer roll 66 and ITM 54, which is supported by back-up roll 60. In other embodiments, the toner image is transferred to the media sheet directly by the PC drum(s) 302. Cleaner unit 306 removes toner remnants from PC drum 302 and an ITM cleaner unit 80 removes toner remnants from ITM 54. The toner remnants removed by cleaner unit 306 and ITM cleaner unit 80 are delivered to and stored in a waste toner container 400 to prevent the residual toner from releasing inside image forming device 20.

The media sheet with the toner image is then moved along the media path 32 and into a fuser area 68. Fuser area 68 includes fusing rolls or belts 70 that form a nip 72 to adhere the toner image to the media sheet. The fused media sheet then passes through transport rolls 74 located downstream from fuser area 68, which move the media sheet to an output area 76 of image forming device 20 or to duplex path 36 for image formation on a second side of the media sheet, as desired.

Figure 2:
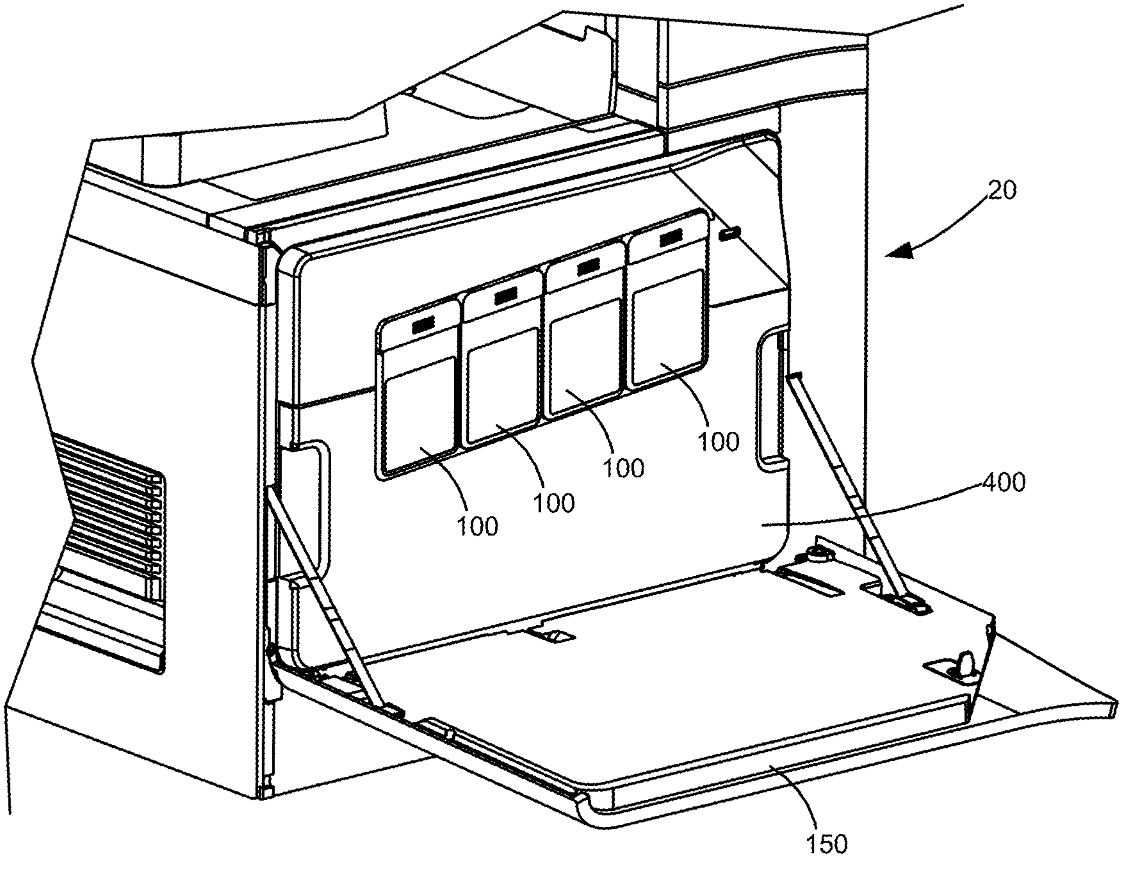
FIG. 2 is a perspective view of the image forming device with a front access door opened according to one example embodiment.

FIG. 2 shows image forming device 20 according to one example embodiment with housing 22 having an access door 150 in an open position exposing interior components of image forming device 20, including toner cartridges 100 and waste toner container 400. Access door 150 permits user replacement of toner cartridges 100, waste toner container 400 and other components of image forming device 20.

Figure 3:
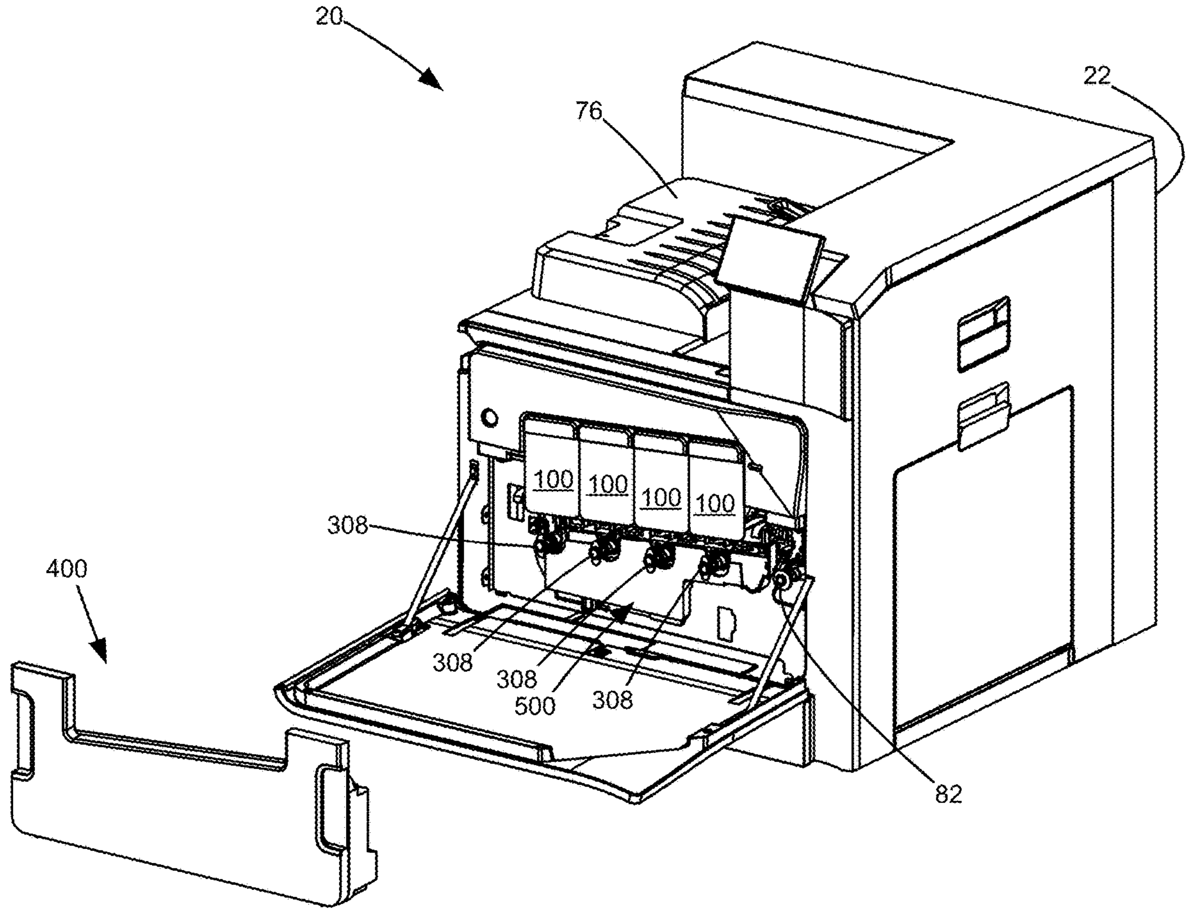
FIG. 3 is a perspective view of the image forming device shown in FIG. 2 with the front access door opened and a waste toner container removed from the image forming device according to one example embodiment.

FIG. 3 shows waste toner container 400 removed from image forming device 20 exposing a replaceable imaging unit 500, which includes developer units 200 and PC units 300. Developer units 200 and PC units 300 may be components of imaging unit 500 or removable from and replaceable independent of imaging unit 500.

Figure 4:
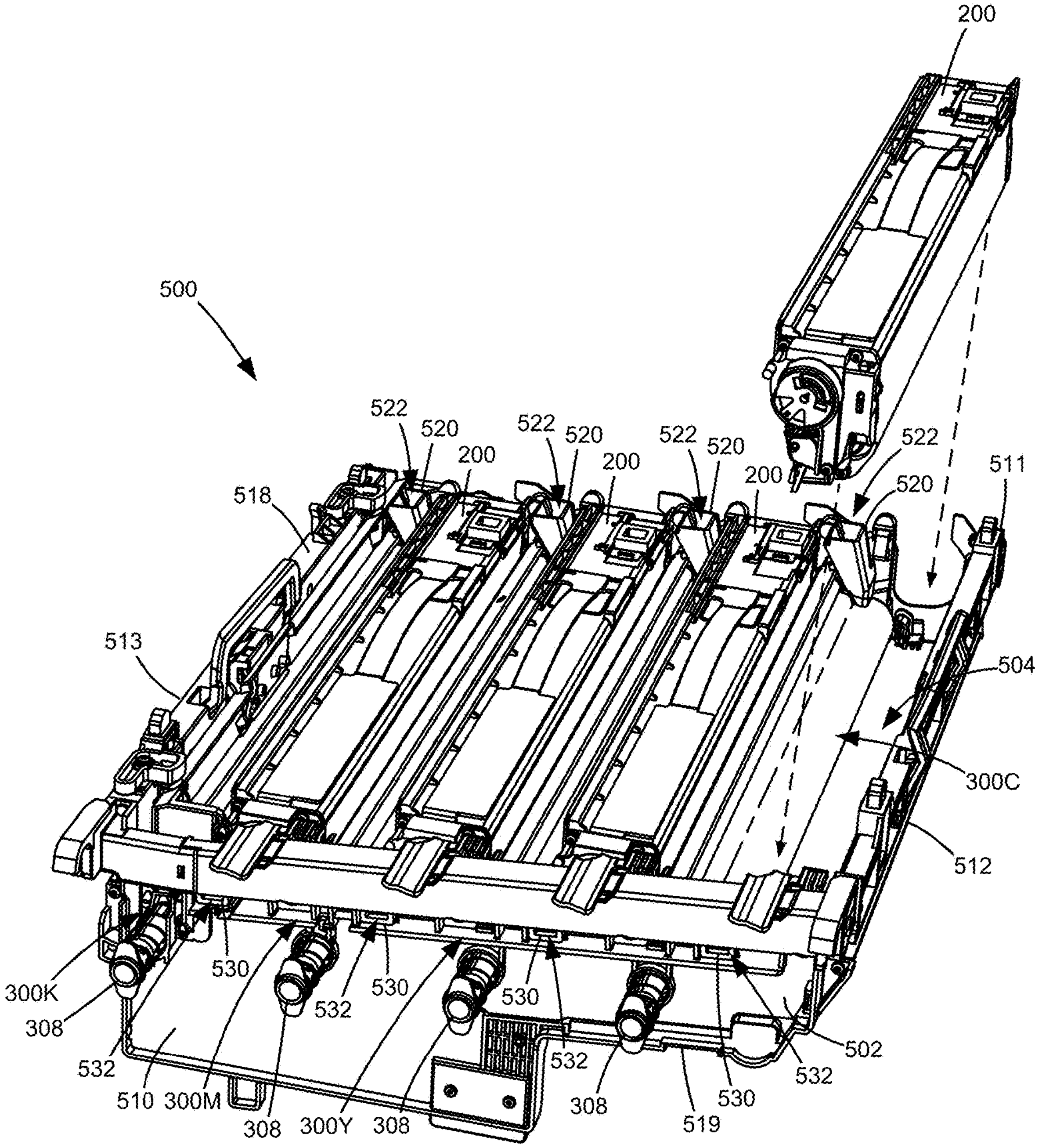
FIG. 4 is a perspective view of an imaging unit of the image forming device according to one example embodiment.

FIG. 4 shows imaging unit 500 according to one example embodiment. Imaging unit 500 is removably installable in image forming device 20. Imaging unit 500 includes a frame 502 that supports the components of imaging stations 50. In the embodiment illustrated, frame 502 includes four positioning slots 504 that each hold a respective developer unit 200 and PC unit 300. Each PC unit 300 is positioned beneath a respective developer unit 200 as viewed in FIG. 4. In one embodiment, each developer unit 200 is individually removable from imaging unit 500, and each PC unit 300 is fixed to imaging unit 500. In another embodiment, the PC unit 300K on the far left as viewed in FIG. 4, which forms part of the black toner imaging station 50, is removable from imaging unit 500 while the remaining three PC units 300M, 300Y, 300C, which form part of the color toner (e.g., magenta, yellow, cyan) imaging stations 50, are fixed to imaging unit 500. This configuration permits replacement of the black PC unit 300K separate from the color PC units 300M, 300Y, 300C in the event that the black PC unit 300K requires replacement more frequently than the color PC units 300M, 300Y, 300C due to higher consumption of black toner than color toner. In other embodiments, all or a subset of color PC units 300M, 300Y, 300C may be individually removable from imaging basket 500 as desired. For example, in another embodiment, all four PC units 300 are individually removable from imaging unit 500. Where one or more of PC units 300 is removable from imaging unit 500, the PC unit 300 may be fixed to its corresponding developer unit 200 or separable therefrom. In another embodiment, developer units 200 and PC units 300 are fixed to imaging unit 500.

Frame 502 includes a front end 510, a rear end 511, a pair of sides 512, 513, a top 518 and a bottom 519. Positioning slots 504 are open at the top 518 of frame 502 to permit removal and insertion of the replaceable developer units 200 and PC units 300. In the embodiment illustrated, imaging unit 500 slides into and out of image forming device 20. Front end 510 of frame 502 leads as imaging unit 500 slides out of image forming device 20 and rear end 511 trails. Conversely, rear end 511 of frame 502 leads as imaging unit 500 slides into image forming device 20 and front end 510 trails.

In the example embodiment illustrated, the cleaner unit 306 of each PC unit 300 includes a waste toner outlet 308 for transferring toner from each PC unit 300 to waste toner container 400. In the embodiment illustrated, waste toner outlets 308 are positioned on cantilevered extensions from PC units 300 at front end 510 of imaging unit 500.

Each imaging station 50 includes a pair of air ducts 520, 530 for transferring forced air for cooling a respective axial end of the imaging station 50. Air ducts 520, 530 include respective inlets 522, 532 for receiving forced air from one or more fans in image forming device 20. Air ducts 520 are positioned on imaging unit 500 proximate to rear end 511 of frame 502 and extend generally downward for delivering forced air to the axial ends of imaging stations 50 proximate to rear end 511 of frame 502 as discussed in greater detail below. Air ducts 530 are positioned on imaging unit 500 and extend through front end 510 of frame 502 for delivering forced air to the axial ends of imaging stations 50 proximate to front end 510 of frame 502 as discussed in greater detail below.

Figure 5:
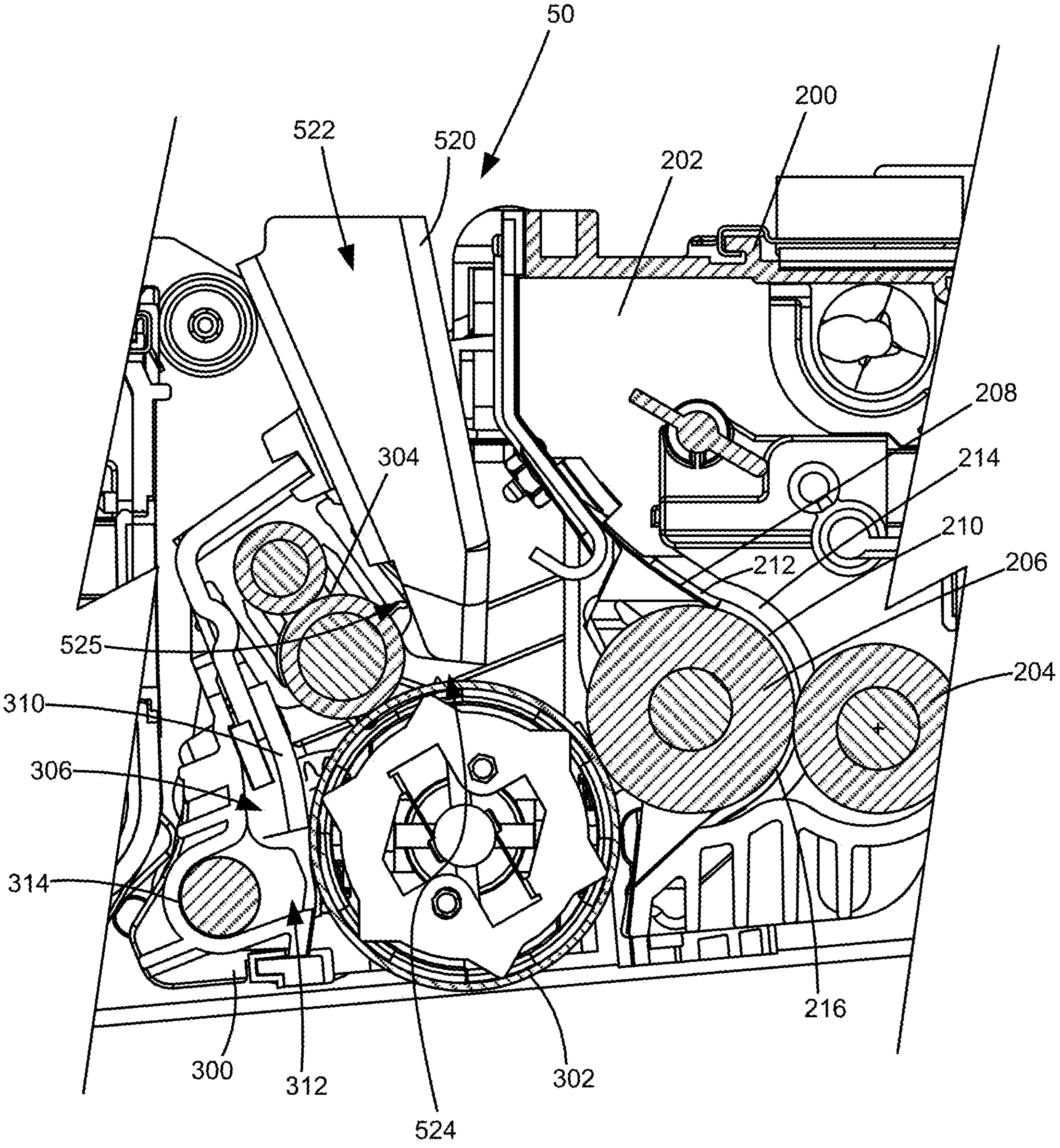
FIG. 5 is a cross-sectional view of the imaging unit showing an air duct at a first end of the imaging unit according to one example embodiment.

FIG. 5 is a cross-sectional view of imaging unit 500 showing the positioning of air duct 520 relative to imaging station 50 according to one example embodiment. FIG. 5 shows the outer surface of toner adder roll 204 forming a nip with the outer surface of developer roll 206 allowing toner adder roll 204 to supply toner from reservoir 202 to the outer surface of developer roll 206. As discussed above, doctor blade 208 meters toner on the outer surface of developer roll 206. The outer surface of developer roll 206 forms a nip with the outer surface of PC drum 302, allowing developer roll 206 to transfer toner to the latent image on the outer surface of PC drum 302. Charging roll 304 contacts PC drum 302 for charging the outer surface of PC drum 302 prior to exposure to printhead 52. FIG. 5 also shows a cleaner blade 310 of cleaner unit 306 positioned to remove any residual toner adhering to the outer surface of PC drum 302 after the transfer of toner from PC drum 302 to ITM 54. PC unit 300 also includes a waste toner channel 312 that receives toner removed from the outer surface of PC drum 302 by cleaner blade 310. A rotatable auger 314 is positioned in waste toner channel 312 for moving toner therein to waste toner outlet 308 for transfer to waste toner container 400.

FIG. 5 also shows an example end seal 210 positioned in developer unit 200 at an axial end of developer roll 206, proximate to rear end 511 of imaging unit 500. A second end seal (not shown) is positioned at the opposite axial end of developer roll 206, proximate to front end 510 of imaging unit 500, and may be a mirror image of end seal 210. A blade seal portion 212 of end seal 210 is compressed between a housing 214 of developer unit 200 and an end portion of doctor blade 208. A rotary seal portion 216 of end seal 210 is compressed between housing 214 and an axial end portion of the outer surface of developer roll 206. End seal 210 may be described as J-shaped due to its substantially straight blade seal portion 212 and connecting curved rotary seal portion 216. End seal 210 prevents toner from leaking at the axial end of developer roll 206 at the interface between housing 214, developer roll 206 and doctor blade 208. In some embodiments, end seal 210 includes a molded (e.g., injection molded or compression molded) body made of a polymeric elastomeric material. One suitable example of an elastomeric material is SANTOPRENE™, a thermoplastic vulcanizate available from Exxon Mobil Corporation. In other embodiments, end seal 210 is composed of foam, felt, or the like.

As shown in FIG. 5, air duct 520 includes one or more outlets 524, 525 positioned to direct air flowing through air duct 520 to PC drum 302 and/or charging roll 304 in order to cool PC drum 302, directly by convection when air is directed to PC drum 302 and/or indirectly by contact between PC drum 302 and charging roll 304 when air is directed to charging roll 304. For example, in the embodiment illustrated, air duct 520 includes a first outlet 524 positioned to direct air onto the outer surface of PC drum 302 and a second outlet 525 positioned to direct air onto the outer surface of charging roll 304.

During operation, heat is generated by friction between the outer surface of rotating developer roll 206 and stationary end seal 210. In a single component development system, where the outer surface of developer roll 206 is in direct contact with the outer surface of PC drum 302, directing forced air onto the outer surface(s) of PC drum 302 and/or charging roll 304 allows PC drum 302 to act as a heat sink to pull or absorb heat from developer roll 206 in order to reduce the temperature of developer roll 206 during operation. Cooling developer roll 206 during operation helps permit image forming device 20 to operate at higher print speeds and helps extend the duty cycle of operation of image forming device 20.

Outlet(s) 524, 525 of air duct 520 are positioned to avoid directing air from air duct 520 directly onto the outer surface of developer roll 206 to avoid blowing or spraying toner from the outer surface of developer roll 206. It has been observed that while directing air directly onto the outer surface of developer roll 206 provides effective cooling of developer roll 206, it may also tend to spray toner from the outer surface of developer roll 206 onto neighboring components, including exterior surfaces of toner cartridges 100, developer units 200, PC units 300, and imaging unit 500, resulting in uncleanliness and potentially causing print defects. Accordingly, air duct 520 is configured to avoid directing air directly onto the outer surface of developer roll 206 while still effectively cooling developer roll 206.

Figure 6:
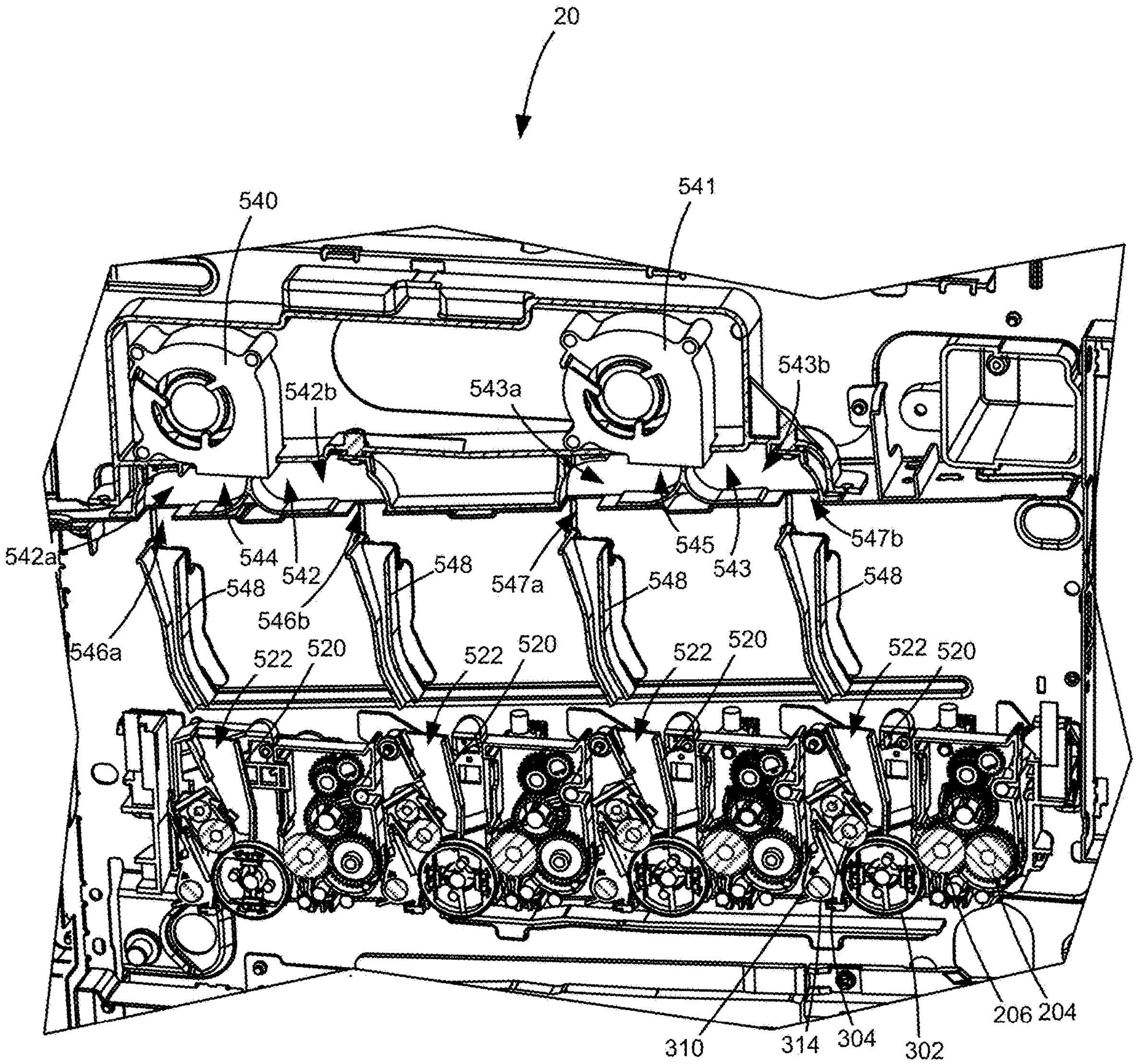
FIG. 6 is a cross-sectional view of the image forming device showing an air pathway from one or more fans to the air ducts of the imaging unit according to one example embodiment.

FIG. 6 is a cross-sectional view of image forming device 20 showing an air pathway from one or more fans to air ducts 520 of imaging unit 500 according to one example embodiment. In this embodiment, image forming device 20 includes a pair of fans 540, 541 that create airflow that is directed to air ducts 520 of imaging units 500. Other embodiments may include a single fan or more than two fans as desired. In this embodiment, each fan 540, 541 includes a receiving duct 542, 543 positioned at an outlet 544, 545 of the fan 540, 541. Each receiving duct 542, 543 is split into two sections 542*a*, 542*b*, 543*a*, 543*b* forming two air pathways from each fan 540, 541. Each receiving duct 542, 543 includes a pair of corresponding outlets 546*a*, 546*b*, 547*a*, 547*b* positioned to direct air to a respective intermediate duct 548 that, in turn, directs air to a respective air duct 520. In this manner, in the embodiment illustrated, each fan 540, 541 supplies air for two of the four air ducts 520 of imaging unit 500.

Figure 7:
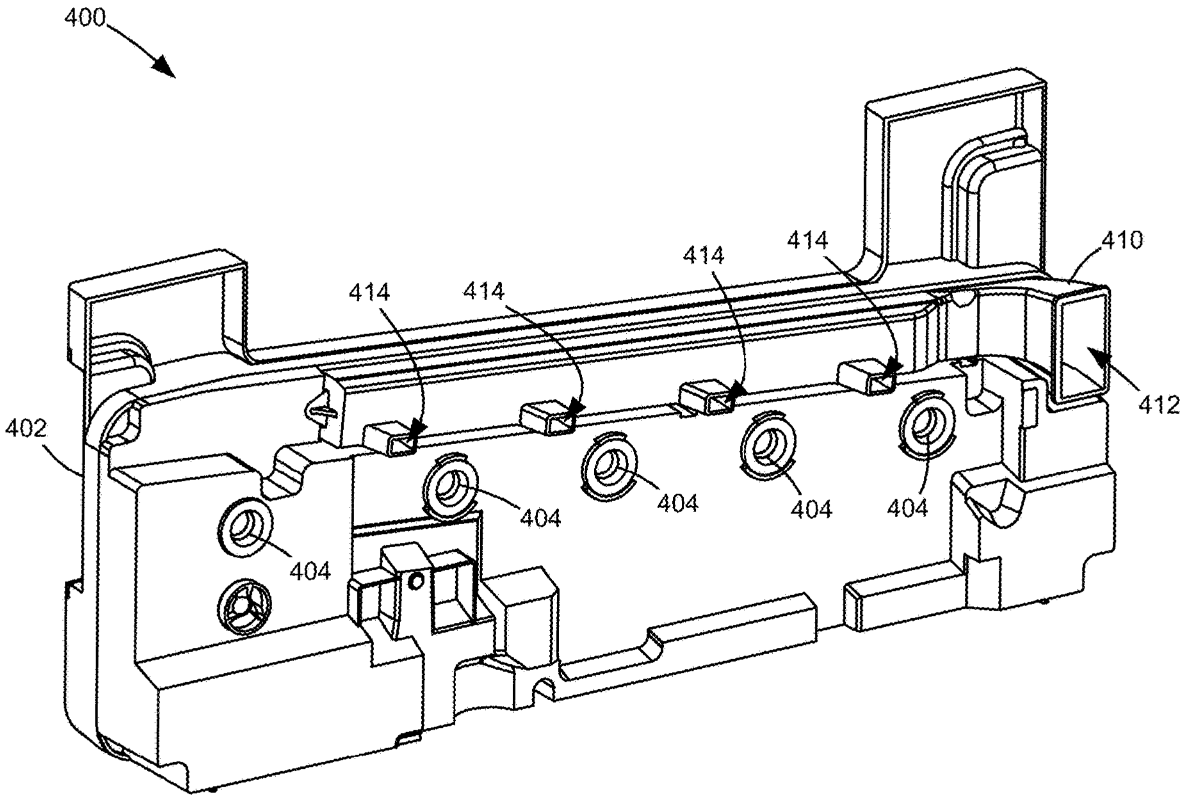
FIG. 7 is a perspective view of a waste toner container of the image forming device according to one example embodiment.

With reference to FIG. 7, waste toner container 400 is shown according to one example embodiment. Waste toner container 400 includes a housing 402 having an interior reservoir for storing waste toner. As discussed above, waste toner container 400 is removable from image forming device 20 and replaceable, such as when waste toner container 400 reaches a full condition. Waste toner container 400 includes waste toner inlet ports 404 positioned to receive toner from corresponding waste toner outlets 308 of each of the four cleaner units 306 and a corresponding waste toner outlet 82 (FIG. 3) of ITM cleaner unit 80 for transferring waste toner from cleaner units 306 and ITM cleaner unit 80 to waste toner container 400. Waste toner inlet ports 404 define respective through holes or openings on housing 402 through which respective waste toner outlets are inserted into housing 402 for depositing waste toner in waste toner container 400. In the example embodiment illustrated, waste toner container 400 includes an air duct 410. In this example, air duct 410 is a separate component attached to housing 402 of waste toner container 400, such as, for example, by a snap-fit engagement or suitable fasteners, but in other embodiments, air duct 410 may be formed integrally with housing 402. In this manner, air duct 410 is removable from image forming device 20 and replaceable with waste toner container 400.

Air duct 410 includes an inlet 412 configured to receive airflow generated by one or more fans of image forming device 20. In the embodiment illustrated, air duct 410 includes four outlets 414 that direct airflow received by inlet 412 to corresponding inlets 532 of air ducts 530 of imaging unit 500 for cooling an axial end of developer roll 206 proximate to front end 510 of imaging unit 500 as discussed in greater detail below.

Figure 8:
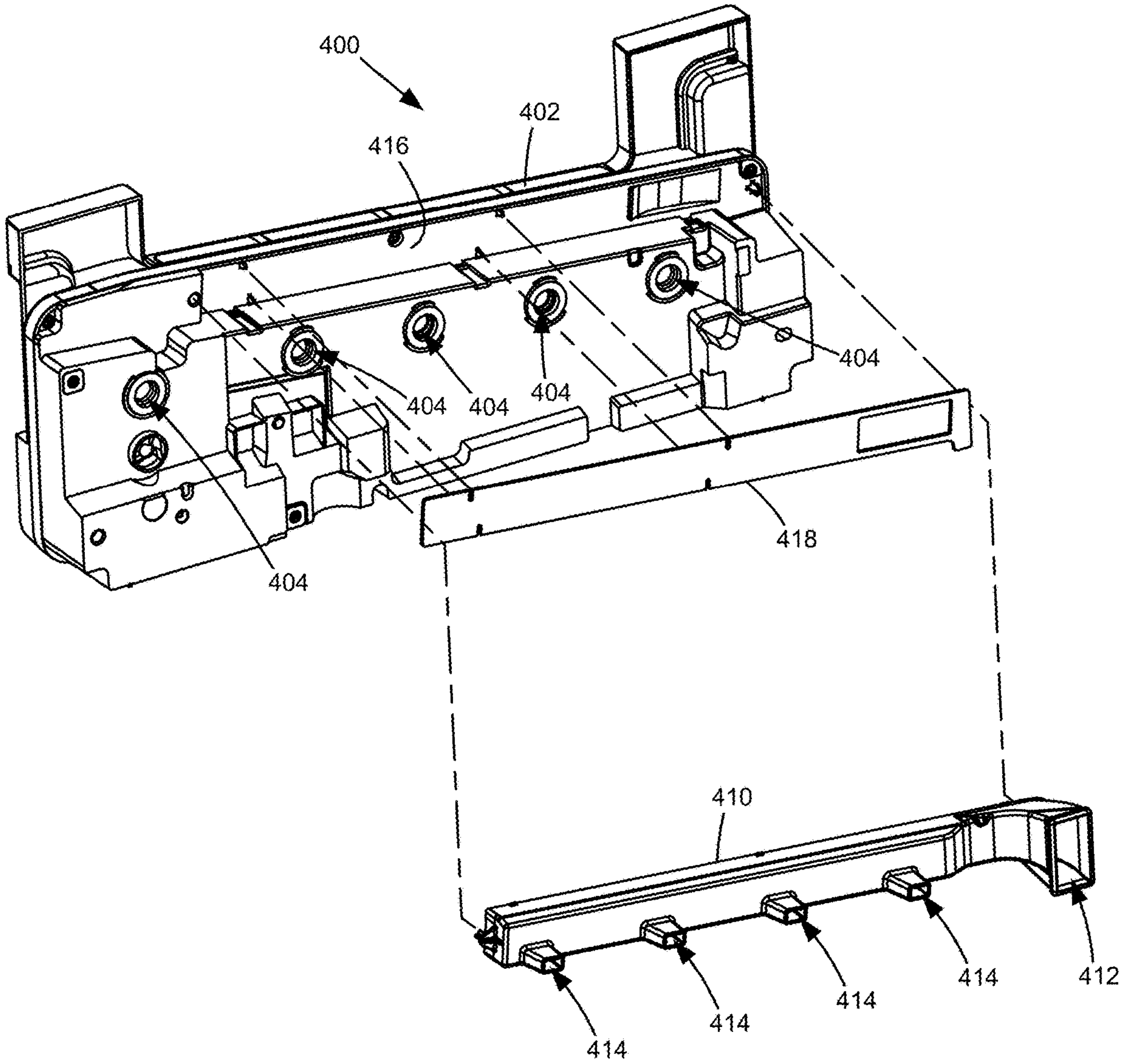
FIG. 8 is a perspective view of the waste toner container with an air duct of detached from the waste toner container according to one example embodiment.

With reference to FIG. 8, in the example embodiment illustrated, one wall of air duct 410 is formed by a portion 416 of an exterior wall of housing 402 of waste toner container 400. That is, in this embodiment, rather than air duct 410 having walls enclosing the air path formed by air duct 410, other than the openings formed by inlet 412 and outlets 414, air duct 410 shares a common wall with housing 402 of waste toner container 400 such that shared portion 416 of the wall of housing 402 defines both the toner reservoir of waste toner container 400 and the air path of air duct 410. A gasket 418 or the like may be positioned along shared portion 416 of the wall of housing 402 in order to help seal air duct 410 against the exterior wall of housing 402.

Figure 9:
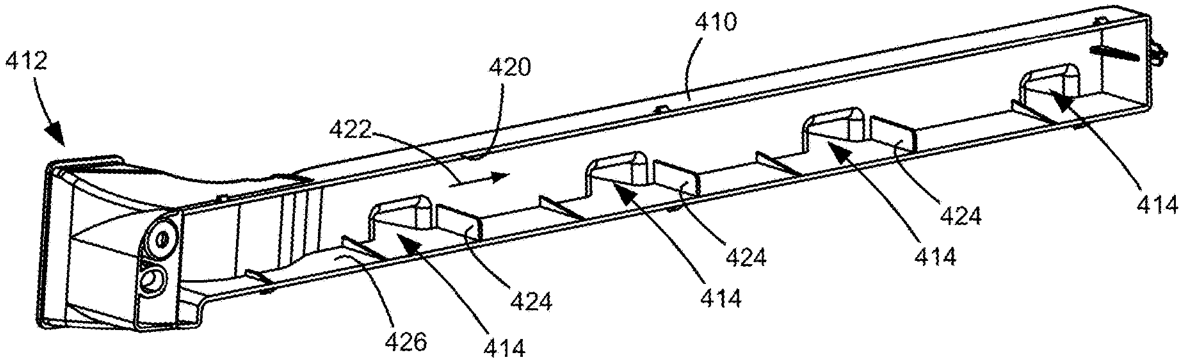
FIG. 9 is a perspective view of the air duct of the waste toner container according to one example embodiment.

With reference to FIG. 9, air duct 410 is shown removed from housing 402 of waste toner container 400. FIG. 9 shows an opening 420 running along a length of air duct 410 opposite outlets 414. Opening 420 mates against portion 416 of the wall of housing 402 when air duct 410 is attached to housing 402 in order to enclose air duct 410. The internal air path 422 through air duct 410 from inlet 412 to outlets 414 is denoted by the arrow shown in FIG. 9. In the example embodiment illustrated, air duct 410 includes a baffle 424 immediately downstream from each of the first three outlets 414 that partially obstructs air path 422. In this example, baffles 424 extend vertically from a bottom internal surface 426 of air duct 410 to a point that is roughly level with a top edge of each outlet 414, although other orientations and dimensions may be used as desired. Baffles 424 help equalize the division of airflow between outlets 414 to prevent the airflow in air duct 410 from concentrating at the outlet 414 farthest from inlet 412 at the expense of the other outlets 414.

Figure 10:
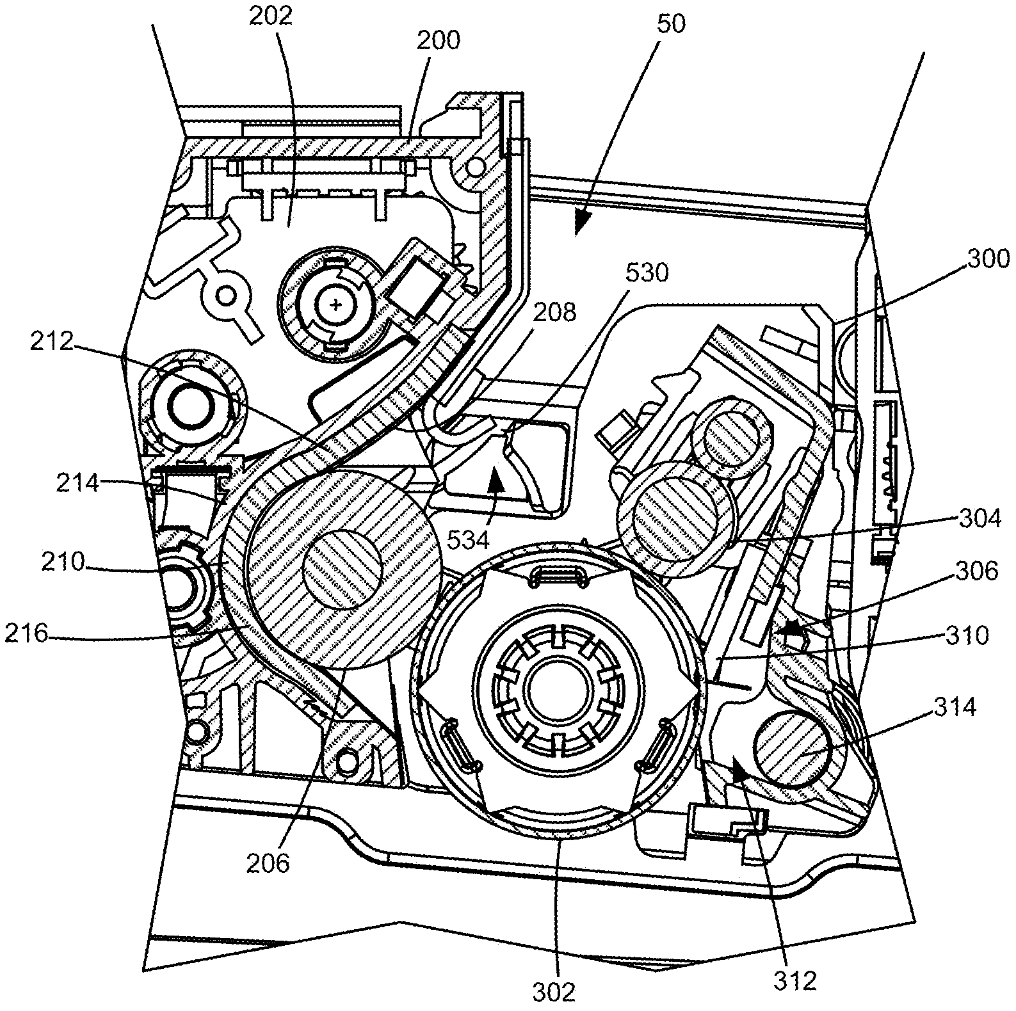
FIG. 10 is a cross-sectional view of the imaging unit showing an air duct at a second end of the imaging unit according to one example embodiment.

FIG. 10 is a cross-sectional view of imaging unit 500 showing the positioning of air duct 530 relative to imaging station 50 according to one example embodiment. FIG. 10 shows an example end seal 210 positioned in developer unit 200 at an axial end of developer roll 206 proximate to front end 510 of imaging unit 500. In the example embodiment shown in FIG. 10, air duct 530 includes an outlet 534 positioned to direct air flowing through air duct 530 to the outer surface of developer roll 206 to cool developer roll 206 directly by convection. However, in other embodiments, one or more outlets of air duct 530 may direct air onto the outer surface of PC drum 302 and/or charging roll 304 in order to indirectly cool developer roll 206 and to reduce the occurrence of toner spray as discussed above with respect to air duct 520.

Although the example image forming device 20 discussed above includes four toner cartridges 100 and corresponding developer units 200 and PC units 300, more or fewer replaceable units may be used depending on the color options needed. For example, in one embodiment, the image forming device includes a single toner cartridge and corresponding developer unit and PC unit in order to permit monochrome printing.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. An imaging system, comprising:

a rotatable photoconductive drum having an outer surface;

a rotatable developer roll having an outer surface in contact with the outer surface of the photoconductive drum for supplying toner to the outer surface of the photoconductive drum;

a rotatable charge roll having an outer surface in contact with the outer surface of the photoconductive drum for electrically charging the outer surface of the photoconductive drum; and an air duct having at least one outlet positioned to direct forced air flowing through the air duct to the outer surface of the charge roll for indirectly cooling the developer roll without directing forced air from the air duct directly onto the outer surface of the developer roll.

2. The imaging system of claim 1, further comprising an end seal having a curved rotary seal portion in contact with the outer surface of the developer roll near an axial end of the developer roll.

3. The imaging system of claim 1, further comprising an imaging basket removably installable in an image forming device and having a positioning slot configured to receive a replaceable developer unit that includes the developer roll, wherein the air duct is positioned on the imaging basket.

4. The imaging system of claim 1, wherein the at least one outlet includes a first outlet positioned to direct forced air flowing through the air duct to the outer surface of the charge roll and a second outlet positioned to direct forced air flowing through the air duct to the outer surface of the photoconductive drum.

5. An imaging system, comprising:

a rotatable photoconductive drum having an outer surface;

a rotatable developer roll having an outer surface in contact with the outer surface of the photoconductive drum for supplying toner to the outer surface of the photoconductive drum;

a rotatable charge roll having an outer surface in contact with the outer surface of the photoconductive drum for electrically charging the outer surface of the photoconductive drum;

an end seal having a curved rotary seal portion in contact with the outer surface of the developer roll near an axial end of the developer roll; and an air duct having at least one outlet positioned to direct forced air flowing through the air duct to the charge roll facilitating a transfer of heat generated by friction between the developer roll and the end seal away from the developer roll.

6. The imaging system of claim 5, wherein the air duct does not direct forced air directly onto the outer surface of the developer roll.

7. The imaging system of claim 5, further comprising an imaging basket removably installable in an image forming device and having a positioning slot configured to receive a replaceable developer unit that includes the developer roll, wherein the air duct is positioned on the imaging basket.

8. The imaging system of claim 5, wherein the at least one outlet includes a first outlet positioned to direct forced air flowing through the air duct to the charge roll and a second outlet positioned to direct forced air flowing through the air duct to the photoconductive drum.

* * * * *